US011778285B2

(12) United States Patent
Harron et al.

(10) Patent No.: US 11,778,285 B2
(45) Date of Patent: *Oct. 3, 2023

(54) COMPUTING SYSTEM WITH CHANNEL-CHANGE-BASED TRIGGER FEATURE

(71) Applicant: Roku, Inc., San Jose, CA (US)

(72) Inventors: Wilson Harron, Berkeley, CA (US); Konstantinos Antonios Dimitriou, Berkeley, CA (US)

(73) Assignee: Roku, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/175,788

(22) Filed: Feb. 15, 2021

(65) Prior Publication Data

US 2021/0185410 A1  Jun. 17, 2021

Related U.S. Application Data

(63) Continuation of application No. 15/399,404, filed on Jan. 5, 2017, now Pat. No. 10,939,185.
(Continued)

(51) Int. Cl.
*H04N 21/84* (2011.01)
*H04N 21/61* (2011.01)
(Continued)

(52) U.S. Cl.
CPC .............. *H04N 21/84* (2013.01); *G06V 20/41* (2022.01); *G06V 20/46* (2022.01); *G06V 20/48* (2022.01);
(Continued)

(58) Field of Classification Search
CPC .......... H04N 21/242; H04N 21/44008; H04N 21/23418; H04N 21/23424;
(Continued)

(56) References Cited

U.S. PATENT DOCUMENTS 5,404,161 A    4/1995  Douglass et al.
6,609,167 B1   8/2003  Bastiani et al.
(Continued)

FOREIGN PATENT DOCUMENTS

CN    101795366 A    2/2009
CN    202712771 U    1/2013
(Continued)

OTHER PUBLICATIONS

International Search Report dated Apr. 24, 2017 issued in connection with International Application No. PCT/US2017/012336 filed Jan. 5, 2017, 4 pages.
(Continued)

*Primary Examiner* — Chenea Davis
(74) *Attorney, Agent, or Firm* — Sterne, Kessler, Goldstein & Fox P.L.L.C.

(57) ABSTRACT

In one aspect, an example method includes (i) receiving, by a computing system, media content; (ii) generating, by the computing system, a fingerprint of the received media content; (iii) determining, by the computing system, that a channel-change operation was performed; (iv) responsive to determining that the channel-change operation was performed, transmitting, by the computing system, the generated fingerprint to a content identification server to identify the received media content; and (v) performing an action based on the identified media content.

20 Claims, 5 Drawing Sheets

Related U.S. Application Data

(60) Provisional application No. 62/275,081, filed on Jan. 5, 2016.

(51) Int. Cl.

| | | |
|---|---|---|
| *H04N 21/234* | (2011.01) | |
| *H04N 21/81* | (2011.01) | |
| *H04N 21/845* | (2011.01) | |
| *H04N 21/44* | (2011.01) | |
| *G06V 20/40* | (2022.01) | |
| *H04N 21/242* | (2011.01) | |
| *H04N 21/438* | (2011.01) | |
| *H04N 21/475* | (2011.01) | |
| *G06N 20/00* | (2019.01) | |

(52) U.S. Cl.
CPC . *H04N 21/23418* (2013.01); *H04N 21/23424* (2013.01); *H04N 21/242* (2013.01); *H04N 21/4383* (2013.01); *H04N 21/44008* (2013.01); *H04N 21/4756* (2013.01); *H04N 21/6125* (2013.01); *H04N 21/812* (2013.01); *H04N 21/845* (2013.01); *G06N 20/00* (2019.01)

(58) Field of Classification Search
CPC ........... H04N 21/4756; H04N 21/4383; H04N 21/6125; H04N 21/84; H04N 21/845; G06V 20/41; G06V 20/48; G06V 20/46; G06N 20/00
See application file for complete search history.

(56) References Cited

U.S. PATENT DOCUMENTS

| | | | |
|---|---|---|---|
| 7,698,236 | B2 | 4/2010 | Cox et al. |
| 8,756,623 | B2 | 6/2014 | Park et al. |
| 9,049,496 | B2 | 6/2015 | Raesig et al. |
| 9,071,370 | B2 | 6/2015 | Toner et al. |
| 9,071,868 | B2 | 6/2015 | Neumeier et al. |
| 9,071,869 | B2 | 6/2015 | Park et al. |
| 9,147,112 | B2 * | 9/2015 | Lienhart ............ H04N 21/2668 |
| 9,148,610 | B2 | 9/2015 | Yabu |
| 9,160,837 | B2 | 10/2015 | Jeffrey et al. |
| 9,258,604 | B1 | 2/2016 | Bilobrov et al. |
| 9,301,008 | B2 | 3/2016 | Park et al. |
| 9,396,737 | B2 | 7/2016 | Cha et al. |
| 9,503,778 | B2 | 11/2016 | Kitazato |
| 9,560,102 | B2 | 1/2017 | Raesig et al. |
| 9,706,233 | B2 | 7/2017 | Gordon |
| 9,967,613 | B2 | 5/2018 | Kitazato |
| 10,045,074 | B2 | 8/2018 | Lee et al. |
| 10,225,609 | B2 | 3/2019 | Lee et al. |
| 10,432,999 | B2 | 10/2019 | Ahn et al. |
| 10,440,423 | B2 | 10/2019 | Kitazato |
| 10,939,185 | B2 | 3/2021 | Harron et al. |
| 2002/0062481 | A1 | 5/2002 | Slaney et al. |
| 2003/0093784 | A1 | 5/2003 | Dimitrova et al. |
| 2005/0128353 | A1 | 6/2005 | Young et al. |
| 2007/0220592 | A1 | 9/2007 | Muehlbauer |
| 2009/0077589 | A1 | 3/2009 | Boyer et al. |
| 2009/0119710 | A1 | 5/2009 | Lo et al. |
| 2009/0165043 | A1 | 6/2009 | Ou et al. |
| 2009/0324199 | A1 | 12/2009 | Haitsma et al. |
| 2010/0211439 | A1 | 8/2010 | Marci et al. |
| 2011/0184894 | A1 | 7/2011 | Cohen et al. |
| 2011/0184895 | A1 | 7/2011 | Janssen |
| 2011/0276333 | A1 | 11/2011 | Wang et al. |
| 2012/0109726 | A1 | 5/2012 | Ruffini |
| 2012/0117584 | A1 | 5/2012 | Gordon |
| 2012/0144442 | A1 | 6/2012 | Chiang et al. |
| 2013/0002887 | A1 | 1/2013 | Bruce-Smith |
| 2013/0007201 | A1 * | 1/2013 | Jeffrey ............ H04N 21/44008 709/217 |
| 2013/0047182 | A1 | 2/2013 | Gudlavenkatasiva et al. |
| 2013/0058522 | A1 * | 3/2013 | Raesig .................... H04L 65/60 709/219 |
| 2013/0205326 | A1 | 8/2013 | Sinha et al. |
| 2013/0254787 | A1 | 9/2013 | Cox et al. |
| 2013/0290502 | A1 | 10/2013 | Bilobrov et al. |
| 2014/0006022 | A1 | 1/2014 | Yoon et al. |
| 2014/0104033 | A1 | 4/2014 | Griffiths et al. |
| 2014/0115627 | A1 | 4/2014 | Lee et al. |
| 2014/0201787 | A1 * | 7/2014 | Neumeier .......... H04N 21/4394 725/34 |
| 2014/0230002 | A1 | 8/2014 | Kitazato |
| 2014/0293130 | A1 | 10/2014 | Yabu |
| 2014/0298387 | A1 | 10/2014 | Boyer et al. |
| 2015/0120839 | A1 | 4/2015 | Kannan et al. |
| 2015/0317302 | A1 | 11/2015 | Liu et al. |
| 2016/0029055 | A1 | 1/2016 | Villegas Nunez et al. |
| 2016/0094868 | A1 * | 3/2016 | Singhal ............ H04N 21/41265 725/38 |
| 2016/0127759 | A1 | 5/2016 | Jung et al. |
| 2016/0337691 | A1 | 11/2016 | Prasad et al. |
| 2017/0070771 | A1 | 3/2017 | Kitazato |
| 2018/0048743 | A1 | 2/2018 | Misra et al. |

FOREIGN PATENT DOCUMENTS

| | | |
|---|---|---|
| CN | 103814569 A | 5/2014 |
| CN | 104410913 A | 3/2015 |
| CN | 104854875 A | 8/2015 |
| EP | 2760200 A1 | 7/2014 |
| JP | 2013013092 A | 1/2013 |
| JP | 2013-070268 A | 4/2013 |
| JP | 2013531937 A | 8/2013 |
| JP | 2014010449 A | 1/2014 |
| JP | 2014192629 A | 10/2014 |
| JP | 2009542081 A | 11/2019 |
| WO | WO 2007/148264 A1 | 12/2007 |

OTHER PUBLICATIONS

International Written Opinion dated Apr. 24, 2017 issued in connection with International Application No. PCT/US2017/012336 filed Jan. 5, 2017, 10 pages.

* cited by examiner

COMPUTING SYSTEM WITH CHANNEL-CHANGE-BASED TRIGGER FEATURE

RELATED DISCLOSURE

This application is a continuation of U.S. patent application Ser. No. 15/399,404, filed Jan. 5, 2017, which claims priority to U.S. Provisional Patent Application No. 62/275,081, titled "Video Classifier," filed on Jan. 5, 2016, the contents of both of which are hereby incorporated by reference in their entirety.

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, an example method is disclosed. The method includes (i) receiving, by a computing system, media content; (ii) generating, by the computing system, a fingerprint of the received media content; (iii) determining, by the computing system, that a channel-change operation was performed; (iv) responsive to determining that the channel-change operation was performed, transmitting, by the computing system, the generated fingerprint to a content identification server to identify the received media content; and (v) performing an action based on the identified media content.

In another aspect, an example non-transitory computer-readable medium is disclosed. The computer-readable medium has stored thereon program instructions that upon execution by a processor, cause performance of a set of acts including (i) receiving, by a computing system, media content; (ii) generating, by the computing system, a fingerprint of the received media content; (iii) determining, by the computing system, that a channel-change operation was performed; (iv) responsive to determining that the channel-change operation was performed, transmitting, by the computing system, the generated fingerprint to a content identification server to identify the received media content; and (v) performing an action based on the identified media content.

In another aspect, an example computing system is disclosed. The computing system is configured for performing a set of acts including (i) receiving, by the computing system, media content; (ii) generating, by the computing system, a fingerprint of the received media content; (iii) determining, by the computing system, that a channel-change operation was performed; (iv) responsive to determining that the channel-change operation was performed, transmitting, by the computing system, the generated fingerprint to a content identification server to identify the received media content; and (v) performing an action based on the identified media content.

In another aspect, another example method is disclosed. The method includes (i) receiving, by a computing system, media content; (ii) generating, by the computing system, a fingerprint of the received media content; (iii) determining, by the computing system, that a remote controller transmitted an instruction configured to cause performance of a channel-change operation; (iv) responsive to determining that the remote controller transmitted an instruction configured to cause performance of the channel-change operation, transmitting, by the computing system, the generated fingerprint to a content identification server to identify the received media content; and (v) performing an action based on the identified media content.

In another aspect, another example non-transitory computer-readable medium is disclosed. The computer-readable medium has stored thereon program instructions that upon execution by a processor, cause performance of a set of acts including (i) receiving, by a computing system, media content; (ii) generating, by the computing system, a fingerprint of the received media content; (iii) determining, by the computing system, that a remote controller transmitted an instruction configured to cause performance of a channel-change operation; (iv) responsive to determining that the remote controller transmitted an instruction configured to cause performance of the channel-change operation, transmitting, by the computing system, the generated fingerprint to a content identification server to identify the received media content; and (v) performing an action based on the identified media content.

In another aspect, another example computing system is disclosed. The computing system is configured for performing a set of acts including (i) receiving, by the computing system, media content; (ii) generating, by the computing system, a fingerprint of the received media content; (iii) determining, by the computing system, that a remote controller transmitted an instruction configured to cause performance of a channel-change operation; (iv) responsive to determining that the remote controller transmitted an instruction configured to cause performance of the channel-change operation, transmitting, by the computing system, the generated fingerprint to a content identification server to identify the received media content; and (v) performing an action based on the identified media content.

DETAILED DESCRIPTION

I. Overview

Figure 1:
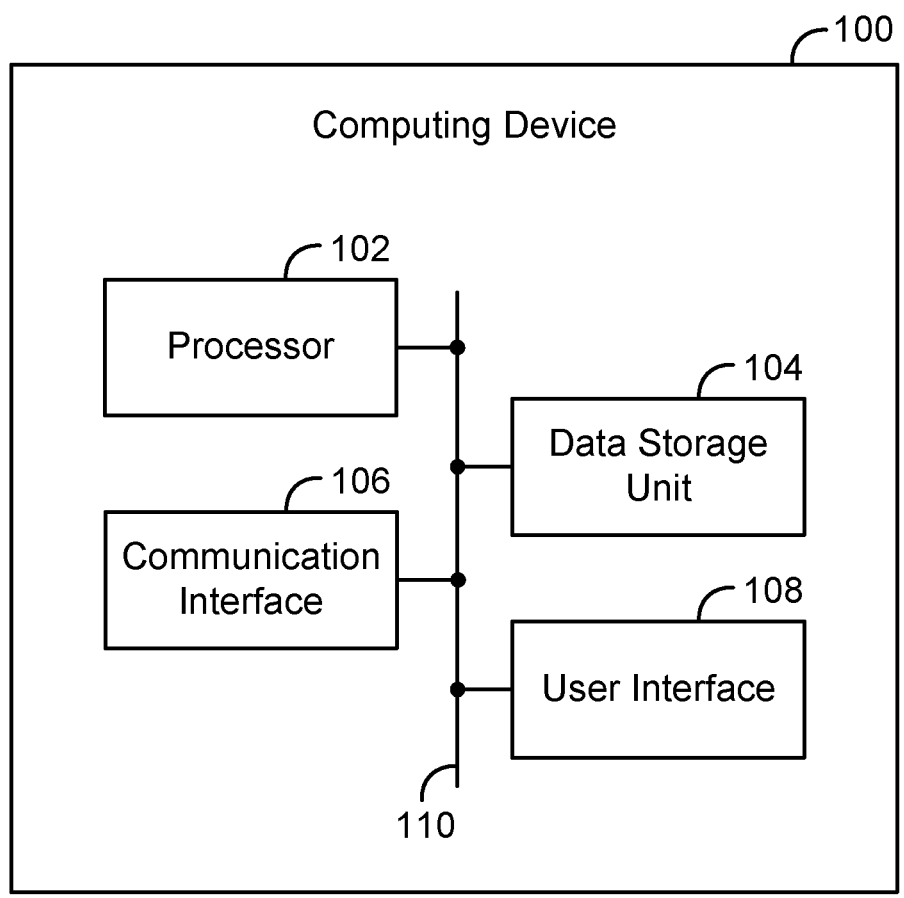
FIG. 1 is a simplified block diagram of an example computing device.

Within a media content delivery and presentation system, a receiver (e.g., a cable receiver or a satellite receiver) can provide media content to a media presentation device (e.g., a television), which can receive and present the media content for an end-user.

In some instances, it can be desirable to identify the media content that the media presentation device is receiving and/or presenting. Among other things, this can allow an entity such as the media presentation device to perform an action based on the identified media content. For example, based on the identified media content, the media presentation device can cause supplemental content (e.g., a contextually appropriate advertisement) to be presented in conjunction with the media content being presented by the media presentation device (e.g., by overlaying the supplemental content on the presented media content).

In one example, a fingerprint-based technique can be used to identify the media content. As such, the media presentation device can receive media content, and can generate a fingerprint of the received media content. The media presentation device can then transmit the fingerprint to a content identification server for analysis, which can use the fingerprint to identify the media content. Based on the identified media content, the content identification server can take, or cause to be taken, one or more actions, such as causing the media presentation device to perform the action described above.

As noted above, the media presentation device can generate and/or transmit a fingerprint to the content identification server periodically or from time so that the media content can be identified. In practice, many media presentation devices can generate and/or transmit fingerprints in this manner, which collectively can strain operation of the content identification server. Thus, in some cases, it may be desirable to reduce the number of fingerprints that a given media presentation device generates and/or transmits to the content identification server for analysis. However, this can potentially reduce the ability of the content identification server to accurately identify the media content being presented on the media presentation device at a given time.

In one aspect, the media presentation device can help address the issues discussed above by using a channel-change operation as a trigger event that causes the media presentation device to transmit the generated fingerprint to the content identification server. For example, in the case where the media presentation device receives the content from the receiver, the act of the media presentation device determining that the channel-change operation was performed can involve the media presentation device determining that the receiver performed a channel-change operation.

In one example, the media presentation device can train a classifier and can determine that the channel-change operation was performed by using the trained classifier. The media presentation device can do this by providing as input to the classifier the received media content and/or related data (e.g., a fingerprint of the received media content). The classifier can thus provide as output, an indication of a position of the media content that corresponds to the occurrence of a channel-change operation.

In another example, the media presentation device can determine that the channel-change operation was performed by determining that a synchronization handshake between the media presentation device and the receiver was lost. Other techniques for determining that the channel-change operation was performed are possible as well.

Responsive to the media presentation device determining that the channel-change operation was performed, the media presentation device can transmit the generated fingerprint to a content identification server to identify the received media content. Then, the content identification server, the media presentation device, and/or another entity can perform an action, based on the identified media content.

This can help reduce the number of instances where the media presentation device transmits a fingerprint to the content identification server for analysis, which can help reduce the chance of the content identification server facing strained operation. This can also generally reduce the use of network and other types of computing resources.

Also, as an alternative to, or in addition to, the media presentation device using a channel-change operation as a trigger event that causes the media presentation device to transmit the generated fingerprint to the content identification server, the media presentation device can determine that a remote controller transmitted an instruction configured to cause performance of a channel-change operation.

As noted above, the receiver can perform a channel change operation for various reasons, such as in response to receiving a channel-change instruction from a remote controller being operated by an end-user. The remote controller can transmit the channel-change instruction to the receiver in various ways, such as by emitting an infrared signal that encodes the instruction, which the receiver can receive via an infrared receiver, such that the receiver can decode and process the signal.

In one example, the media presentation device can also include an infrared receiver. In this case, the act of the media presentation device determining that the remote controller transmitted an instruction configured to cause the receiver to perform a channel-change operation can involve the media presentation device receiving, via the infrared receiver of the media presentation device, the instruction; matching a characteristic of the received instruction with a characteristic of a reference instruction; and based on the matching, determining that the remote controller transmitted an instruction configured to cause the receiver to perform a channel-change operation.

Then, responsive to the media presentation device determining that the remote controller transmitted an instruction configured to cause performance of the channel-change operation, the media presentation device can generate a fingerprint and/or transmit the generated fingerprint to the content identification server, and the media presentation device (or other entity) can perform an action based on the identified media content as discussed above.

II. Example Architecture

A. Computing Device

FIG. 1 is a simplified block diagram of an example computing device 100. The computing device can be configured to perform and/or can perform one or more acts and/or functions, such as those described in this disclosure. The computing device 100 can include various components, such as a processor 102, a data storage unit 104, a communication interface 106, and/or a user interface 108. Each of these components can be connected to each other via a connection mechanism 110.

In this disclosure, the term "connection mechanism" means a mechanism that facilitates communication between two or more components, devices, systems, or other entities. A connection mechanism can be a relatively simple mechanism, such as a cable or system bus, or a relatively complex mechanism, such as a packet-based communication network (e.g., the Internet). In some instances, a connection mechanism can include a non-tangible medium (e.g., in the case where the connection is wireless).

The processor 102 can include a general-purpose processor (e.g., a microprocessor) and/or a special-purpose processor (e.g., a digital signal processor (DSP)). The processor 102 can execute program instructions contained in the data storage unit 104 as discussed below.

The data storage unit 104 can include one or more volatile, non-volatile, removable, and/or non-removable storage components, such as magnetic, optical, and/or flash storage, and/or can be integrated in whole or in part with the processor 102. Further, the data storage unit 104 can take the form of a non-transitory computer-readable storage medium, having stored thereon program instructions (e.g., compiled or non-compiled program logic and/or machine code) that, upon execution by the processor 102, cause the computing device 100 to perform one or more acts and/or functions, such as those described in this disclosure. These program instructions can define and/or be part of a discrete software application. In some instances, the computing device 100 can execute program instructions in response to receiving an input, such as from the communication interface 106 and/or the user interface 108. The data storage unit 104 can also store other types of data, such as those types described in this disclosure.

The communication interface 106 can allow the computing device 100 to connect with and/or communicate with another entity according to one or more protocols. In one example, the communication interface 106 can be a wired interface, such as an Ethernet interface or a High-Definition Multimedia Interface (HDMI). In another example, the communication interface 106 can be a wireless interface, such as a cellular, WI-FI, or infrared (IR) interface. In this disclosure, a connection can be a direct connection or an indirect connection, the latter being a connection that passes through and/or traverses one or more entities, such as a router, switcher, or other network device. Likewise, in this disclosure, a transmission can be a direct transmission or an indirect transmission.

The user interface 108 can include hardware and/or software components that facilitate interaction between the computing device 100 and a user of the computing device 100, if applicable. As such, the user interface 108 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system.

The computing device 100 can take various forms, such as a television, a set-top box, a workstation terminal, a desktop computer, a laptop, a tablet, and/or a mobile phone.

B. Media Content Delivery and Presentation System

Figure 2:
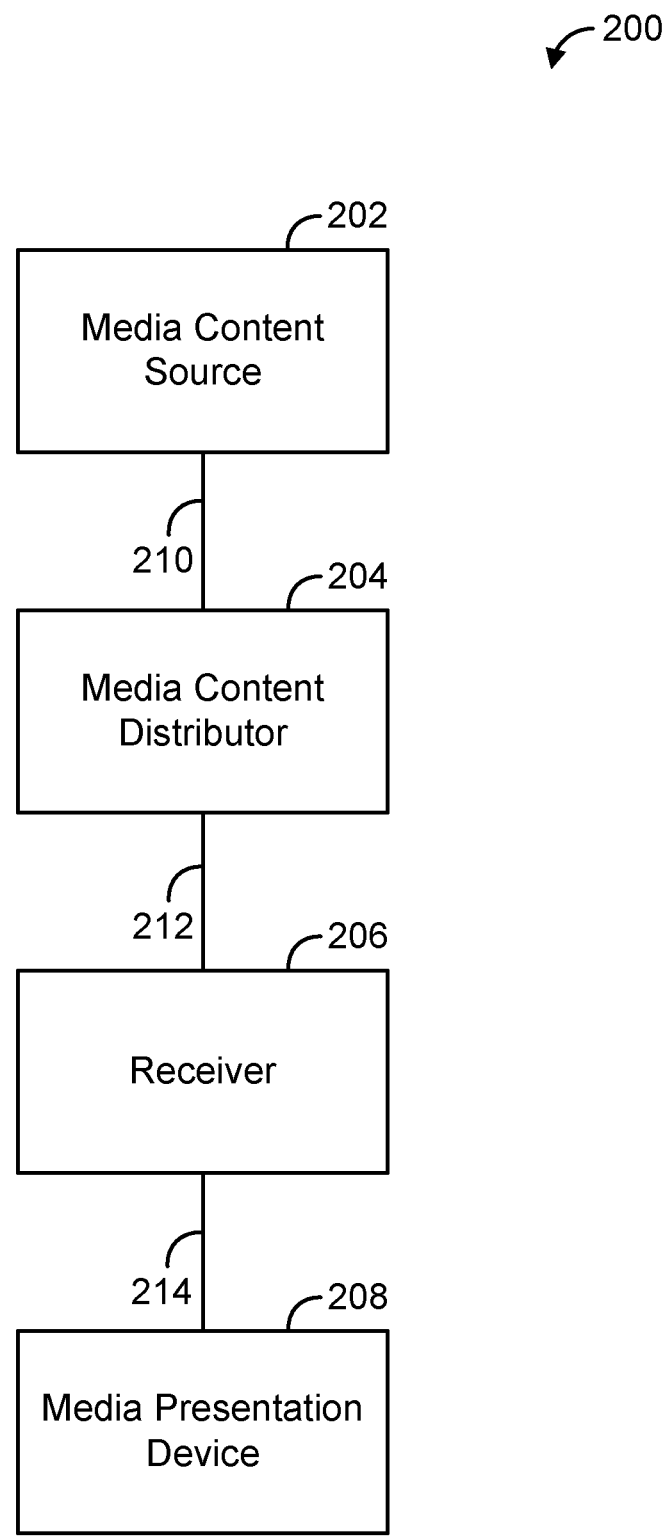
FIG. 2 is a simplified block diagram of an example media content delivery and presentation system.

FIG. 2 is a simplified block diagram of an example media content delivery and presentation system 200. The system 200 can perform various acts and/or functions related to the delivery and/or presentation of media content (e.g., audio content and/or video content), and can be implemented as a computing system. In this disclosure, the term "computing system" means a system that includes at least one computing device. In some instances, a computing system can include one or more other computing systems.

The system 200 can include various components, such as a media content source 202, a media content distributor 204, a receiver 206, and/or a media presentation device 208, each of which can be implemented as a computing system. The system 200 can also include a connection mechanism 210, which connects the media content source 202 with the media content distributor 204; a connection mechanism 212, which connects the media content distributor 204 with the receiver 206; and a connection mechanism 214, which connects the receiver 206 with the media presentation device 208. In practice, the system 200 is likely to include many of some or all of the example components described above.

The media content source 202 and the media content distributor 204 can each take various forms. For example, the media content source 202 can be a broadcaster and/or a web server, and the media content distributor 204 can be a multi-channel distributor (e.g., a cable provider, satellite provider, over-the-air broadcast provider, or a web aggregator). The receiver 206 and the media presentation device 208 can each take various forms as well. For example, the receiver can be a cable receiver, a satellite receiver, an over-the-air broadcast receiver, and/or a streaming media box, and the media presentation device 208 can be a television or another display device, or a loudspeaker or another audio device.

C. Media Content Identification System

Figure 3:
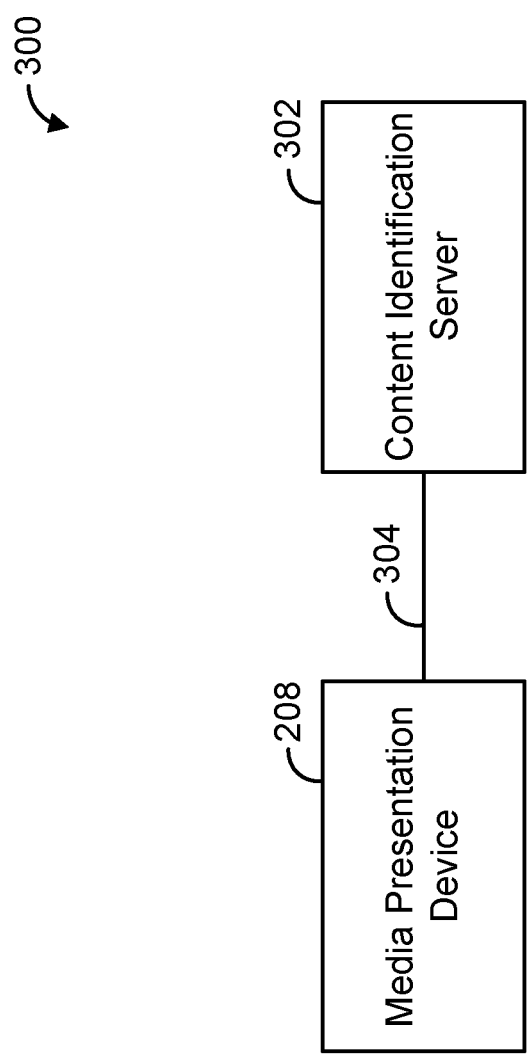
FIG. 3 is a simplified block diagram of an example media content identification system.

FIG. 3 is a simplified block diagram of an example media content identification system 300. The system 300 can perform various acts and/or functions related to media content identification (sometimes referred to as automated content recognition (ACR)), and can be implemented as a computing system.

The system 300 can include various components, such as the media presentation device 208 and a content identification server 302, which can be implemented as a computing system. The system 300 can also include a connection mechanism 304, which connects the media presentation device 208 with the content identification server 302.

III. Example Operations

Referring again to FIG. 2, within the system 200, the media content source 202 can provide media content to the media content distributor 204, which can provide the media content to the receiver, which can provide the media content to the media presentation device 208, which can present the media content to an end-user.

In practice, the system 200 can include many of some or all of the components described above, which can allow media content to be presented to many end-users. Thus, in one example, the media content sources 202 can be national broadcasters, such as ABC, NBC, CBS, FOX, HBO, and CNN, and the media content distributors 204 can be local affiliates and/or other local content distributors in particular designated market areas (DMAs). Further, the receivers 206 and the media presentation devices 208 can be located at customer premises, such as homes or business establishments. With these or other arrangements, the media content sources 202 can deliver media content to the media content distributors 204 for distribution to the receivers 206, and the media content distributors 204 can distribute the media content to the receivers 16 on discrete channels (e.g., particular frequencies). Each receiver 206 can then respond to user input or one or more other trigger events by tuning to a selected channel and transmitting to a media presentation device 208 the media content that is arriving on the selected channel. The media presentation device 208 can then receive and present the media content (e.g., by displaying or otherwise presenting the content).

In some instances, it can be desirable to identify the media content that the media presentation device 208 is receiving and/or presenting. Among other things, this can allow an entity such as the media presentation device 208 to perform an action based on the identified media content. For example, based on the identified media content, the media presentation device 208 can cause supplemental content (e.g., a contextually appropriate advertisement) to be presented in conjunction with the media content being presented by the media presentation device 208 (e.g., by overlaying the supplemental content on the presented media content).

In one example, a fingerprint-based technique can be used to identify the media content. An example of this will now be described. Referring again to FIG. 3, the media presentation device 208 can receive media content, and can generate a fingerprint of the received media content. In one example, the media presentation device 208 can generate the fingerprint while the media presentation device is receiving the media content (e.g., from the receiver 206) and/or while the media presentation device is processing the media content for presentation. The media presentation device 208 can apply any media fingerprinting process now known or later developed to generate a fingerprint of the media content.

In practice, the media presentation device 208 can generate such fingerprints as a fingerprint stream on an ongoing basis, such as on a per frame basis (e.g., on a per key-frame basis) or other basis. The media presentation device 208 can also transmit the fingerprint to the content identification server 302 for analysis. By way of example, the media presentation device 208 can periodically or from time to time generate and/or transmit to the content identification server 302 a fingerprint representing a latest frame, series of frames or other portion of the media content being received and/or presented by the media presentation device 208. In particular, the media presentation device 208 can generate a message carrying the latest generated fingerprint and can transmit the message to the content recognition server's IP address. Such a message could implicitly or explicitly indicate the current time, thus establishing a time at which the media content at issue is being received and/or presented by the media presentation device 208. The content identification server 302 can thereby receive the fingerprint and time information for analysis.

Further, the content identification server 302 can compare the fingerprint of the media content being received and/or presented by the media presentation device 208 with reference fingerprints accessible by the content identification server 302 using any fingerprint comparison process now known or later developed.

Each of the reference fingerprints can correspond with respective data that identifies media content from which the reference fingerprint was generated, and that is accessible by the content identification server 302. In one example, the content identification server 302 can use mapping data to map a given reference fingerprint to respective data that identifies the corresponding media content. The data can identify the media content in various ways, such as by specifying a title, unique identifier, or other data associated with the media content. Thus, by determining that there is a match between a fingerprint representing media content received and/or presented by the media presentation device 208, and a reference fingerprint, the content identification server 302 can use the data corresponding to the reference fingerprint to identify the media content.

Based on the identified media content, the content identification server 302 can take, or cause to be taken, one or more actions. For example, the content identification server 302 can take action based on the identified media content, or the content identification server 302 can signal to another entity, perhaps to the media presentation device 208, to cause the other entity to take action based on the identified media content.

For example, the content identification server 302 can record the fact that the media presentation device 208 is presenting the identified media content as part of a content rating or analytics system to measure the extent to which media content is being received and/or presented by media presentation devices. For instance, the media presentation device 208 can regularly (e.g., periodically) report to the content identification server 302 a fingerprint of the media content that the media presentation device 208 is receiving and/or presenting, and the content identification server 302 can carry out processes such as those discussed herein to determine media content being identified. Each time the content identification server 302 thus identifies media content being received and/or presented by the media presentation device 208, the content identification server 302 can add to a count or other statistic of the media content being received and/or presented. Further, these counts or other statistics can be per media presentation device (as device-specific viewing analytics), indicating the extent to which the media presentation device receives and/or presents the media content.

As another example, the content identification server 302 can responsively cause the media presentation device 208 to present supplemental content, such as an overlay advertisement as discussed above, among other possibilities, possibly as a replacement for one or more portions of the media content. For instance, given an identification of the media content at issue, the content identification server 302 can generate or select (e.g., from a server's data storage unit) particular supplemental media content associated specifically with the identified media content (and perhaps further based on profile data (e.g., device-specific viewing analytics) associated with the particular media presentation device 208) and can transmit the supplemental media content to the media presentation device 208 for the media presentation device 208 to present in conjunction with the media content that the media presentation device 208 is receiving from the receiver 206. The media presentation device 208 can thus receive the supplemental media content from the content identification server 302 and present it in conjunction with the media content that the media presentation device 208 is receiving from the receiver 206.

As noted above, the media presentation device 208 can generate and/or transmit a fingerprint to the content identification server 302 periodically or from time so that the media content can be identified. In practice, many media presentation devices 208 can generate and/or transmit fingerprints in this manner, which collectively can strain operation of the content identification server 302. Thus, in some cases, it may be desirable to reduce the number of fingerprints that a given media presentation device 208 generates and/or transmits to the content identification server 302 for analysis. However, this can potentially reduce the ability of the content identification server 302 to accurately identify the media content being presented on the media presentation device 208 at a given time.

To illustrate how this can be a problem, consider the following scenario. At time $T_1$, the receiver 206 tunes to a first channel, and thus starts to provide first media content received on the first channel to the media presentation device 208, and the media presentation device 208 receives the same. Then, five seconds later, at time $T_2$, the receiver switches channels (perhaps as a result of the receiver 208 receiving a channel-change instruction from a remote controller operated by an end-user) such that it is tuned to a second channel, and thus starts to provide second media content received on the second channel to the media presentation device 208, and media presentation device 208 receives the same. In the case where the media presentation device 208 is configured to generate and transmit fingerprints to the content identification server 302 at a period interval of once every thirty seconds, and the media presentation device 208 generates and transmits a fingerprint at time $T_1$, the content identification server 302 can identify the first media content as soon as the media presentation device 208 begins receiving and/or presenting the first media content. However, because the media presentation device 208 does not generate and transmit the next fingerprint until twenty seconds later, the content identification server 302 cannot identify the second media content until at least twenty-five seconds after time $T_2$, that is, until at least twenty-five seconds after the media presentation device 208 starts receiving and/or presenting the second media content. This delay can reduce or potentially eliminate any benefit or value attained by performing an action based on the identified media content.

In one aspect, the media presentation device 208 can help address the issues discussed above by using a channel-change operation as a trigger event that causes the media presentation device 208 to transmit the generated fingerprint to the content identification server 302. A method incorporating this feature will now be described.

To begin with, the media presentation device 208 can receive media content, such as from the receiver 206, and the media presentation device 208 can generate a fingerprint of the received media content.

Further, the media presentation device 208 can determine that a channel-change operation was performed. In the case where the media presentation device 208 receives the content from the receiver 206, the act of the media presentation device 208 determining that the channel-change operation was performed can involve the media presentation device 208 determining that the receiver 206 performed a channel-change operation.

The receiver 206 can perform a channel-change operation for various reasons. For example, the receiver 206 can change from a first channel to a second channel in response to receiving a channel-change instruction from a remote controller being operated by an end-user (e.g., as a result of the end-user entering a channel number, pressing the up/down channel button, or pressing a guide button, pressing some navigation buttons, and then pressing an enter button).

To allow the media presentation device 208 to determine that the receiver 206 performed a channel-change operation, a training system (which can be the media presentation device 208 or another entity) can employ a machine leaning technique to train a classifier to detect positions within media content that correspond to a channel-change operation. In one example, training system can train a classifier by causing a remote controller to transmit channel-change instructions to a receiver periodically or from time to time, and then by providing as input to the classifier, information about those events (e.g., the number of timing of such events), together with the media content and/or related data (e.g., fingerprints of the media content) output by the receiver. As such, in one example, the classifier can be trained by providing as input to the classifier: (i) multiple portions of sample media content, and (ii) for each of the multiple portions of sample media content, a respective indication of a position within that portion of sample media content that corresponds with an occurrence of a channel-change operation. With this information, the classifier can configure itself to recognize positions in media content that correspond to occurrences of channel-change operations.

The training system can apply any machine learning classification technique (e.g., a technique based on neural network, support vector machines, and/or adaptive filters) now known or later developed to train a classifier to recognize such operations.

Once the classifier is trained, in one example, the media presentation device 208 can determine that the channel-change operation was performed by using the trained classifier to determine that the channel-change operation was performed. The media presentation device 208 can do this by providing as input to the classifier the received media content and/or related data (e.g., a fingerprint of the received media content). The classifier can thus provide as output, an indication of a position of the media content that corresponds to the occurrence of a channel-change operation. In practice, the classifier can output an alert each time the classifier detects a channel-change operation (which thus can implicitly indicate that a channel-change event occurred at the portion of the media content currently being received and/or processed by the media presentation device 208).

In examples where the media content is or includes video content, the classifier can use one or more ranges of frames of video content (e.g., spanning from a few frames to frames representing thirty seconds of video content) when determining whether a channel-change operation occurred. The classifier can also use various sampling rates, such as fifteen frames per second, in connection with analyzing video content for this purpose.

As noted above, the media presentation device 208 can determine that a channel-change operation was performed by using a classifier. In another example, the media presentation device 208 can determine that the channel-change operation was performed by determining that a synchronization handshake between the media presentation device 208 and the receiver 206 was lost.

According to certain interface protocols, such as the HDMI interface protocol, before the receiver 206 can transmit media content to the media presentation device 208, the receiver 206 and the media presentation device 208 may need to establish a handshake. Generally, handshaking is an automated process of negotiation that dynamically sets parameters of a communication channel established between two entities before normal communication over the channel begins. As such, for the receiver 206 to transmit media content to the media presentation device 208, the two devices must first establish a handshake with each other. Once a handshake is established, the receiver 206 can transmit media content to the media presentation device 208 until the something happens that causes the handshake to be lost, in which case the devices will need to establish another handshake before the receiver 206 can transmit additional media content to the media presentation device 208.

In cases where the receiver 206 performs a channel-change event, the receiver can temporarily cease to output media content, which can cause the handshake between the receiver 206 and the media presentation device 208 to be lost. Thus, in one example, by determining that a synchronization handshake between the media presentation device 208 and the receiver 206 was lost, the media presentation device 208 can determine that the receiver 206 performed a channel-change operation. The media presentation device 208 can use any techniques now known or later developed to determine that the handshake was lost.

Responsive to the media presentation device 208 determining that the channel-change operation was performed, the media presentation device 208 can transmit the generated fingerprint to a content identification server 302 to identify the received media content. Then, the content identification server 302, the media presentation device 208, and/or another entity can perform an action, such as any of the actions described above, based on the identified media content.

In some examples, the media presentation device 208 can generate fingerprints periodically or from time to time and can selectively transmit them to the content identification server 302 responsive to the media presentation device 208 determining that the channel-change operation was performed. However, in other examples, the media presentation device 208 can selectively generate the fingerprints and also selectively transmit them to the content identification server 302, both responsive to the media presentation device 208 determining that the channel-change operation was performed.

In some instances, the media presentation device 208 can generate the fingerprint of the received media content proximate a time that the media presentation device 208 determines that the channel-change operation was performed, or perhaps at a time following a predefined time period (e.g., the media presentation device can generate the fingerprint one second after the determination is made). Similarly, the media presentation device 208 can transmit the generated fingerprint proximate a time that the media presentation device 208 determines that the channel-change operation was performed, or perhaps at a time following a predefined time period.

In practice, the media presentation device 208 can continually determine that the channel-change operation was performed, and can responsively generate a fingerprint and/or transmit the generated fingerprint to the content identification server 302 as described above. This can help reduce the number of instances where the media presentation device 208 transmits a fingerprint to the content identification server 302 for analysis, which can help reduce the chance of the content identification server 302 facing strained operation. This can also generally reduce the use of network and other types of computing resources. Further, by generating and/or transmitting fingerprints proximate a time when a channel-change event occurs, the media presentation device 208 can reduce delay in identifying media content as discussed above.

In some cases, in addition to the media presentation device 208 using a channel-change operation as a trigger event that causes the media presentation device 208 to transmit the generated fingerprint to the content identification server 302, the media presentation device 208 can also generate a fingerprint and/or transmit the generated fingerprint to the content identification server 302 on a periodic basis or from time to time (but perhaps less frequency than it otherwise would), serving as a hybrid approach.

Also, as an alternative to, or in addition to, the media presentation device 208 using a channel-change operation as a trigger event that causes the media presentation device 208 to transmit the generated fingerprint to the content identification server 302, the media presentation device 208 can determine that a remote controller transmitted an instruction configured to cause performance of a channel-change operation.

In the case where the media presentation device 208 receives the content from the receiver 206, the act of the media presentation device 208 determining that the channel-change operation was performed can involve the media presentation device 208 determining that the remote controller transmitted an instruction configured to cause the receiver 206 to perform a channel-change operation.

As noted above, the receiver 206 can perform a channel change operation for various reasons, such as in response to receiving a channel-change instruction from a remote controller being operated by an end-user. The remote controller can transmit the channel-change instruction to the receiver in various ways, such as by emitting an infrared signal that encodes the instruction, which the receiver 206 can receive via an infrared receiver, such that the receiver 206 can decode and process the signal.

In one example, the media presentation device 208 can also include an infrared receiver. In this case, the act of the media presentation device 208 determining that the remote controller transmitted an instruction configured to cause the receiver 206 to perform a channel-change operation can involve the media presentation device 208 receiving, via the infrared receiver of the media presentation device 208, the instruction; matching a characteristic of the received instruction with a characteristic of a reference instruction; and based on the matching, determining that the remote controller transmitted an instruction configured to cause the receiver 206 to perform a channel-change operation. Thus, even though an end-user can operate a remote controller for the purposes of controlling the receiver 206, the media presentation device 208 can also receive the instruction and can inspect it to determine if it is a channel-change instruction (e.g., as a result of the end-user entering a channel number, pressing the up/down channel button, or pressing a guide button, pressing some navigation buttons, and then pressing an enter button) as opposed to a volume-change instruction, for instance. In one example, the media presentation device 208 can maintain a set of reference instructions that are known to be channel-change instructions. In other examples, the media presentation device 208 and the receiver 306 can perform similar acts to those described above in connection with an infrared-based interface, but in connection with another type of interface, such as a RF-based interface, instead.

Then, responsive to the media presentation device 208 determining that the remote controller transmitted an instruction configured to cause performance of the channel-change operation, the media presentation device 208 can generate a fingerprint and/or transmit the generated fingerprint to the content identification server 302, and the media presentation device 208 (or other entity) can perform an action based on the identified media content as discussed above.

Figure 4:
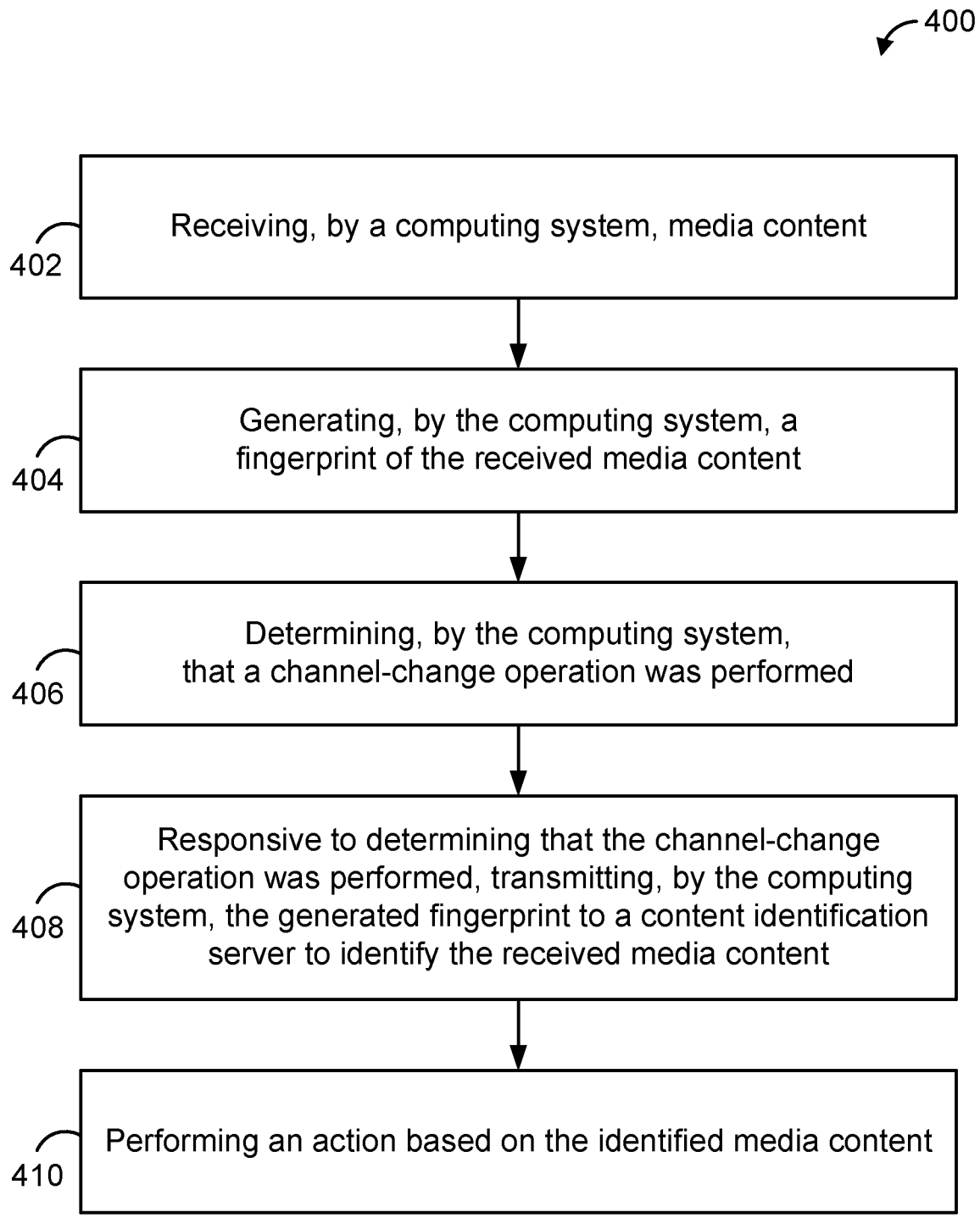
FIG. 4 is a flow chart of an example method.

FIG. 4 is a flow chart illustrating an example method 400. At block 402, the method 400 can include receiving, by a computing system, media content. At block 404, the method 400 can include generating, by the computing system, a fingerprint of the received media content. At block 406, the method 400 can include determining, by the computing system, that a channel-change operation was performed. At block 408, the method 400 can include responsive to determining that the channel-change operation was performed, transmitting, by the computing system, the generated fingerprint to a content identification server to identify the received media content. At block 410, the method 400 can include performing an action based on the identified media content.

Figure 5:
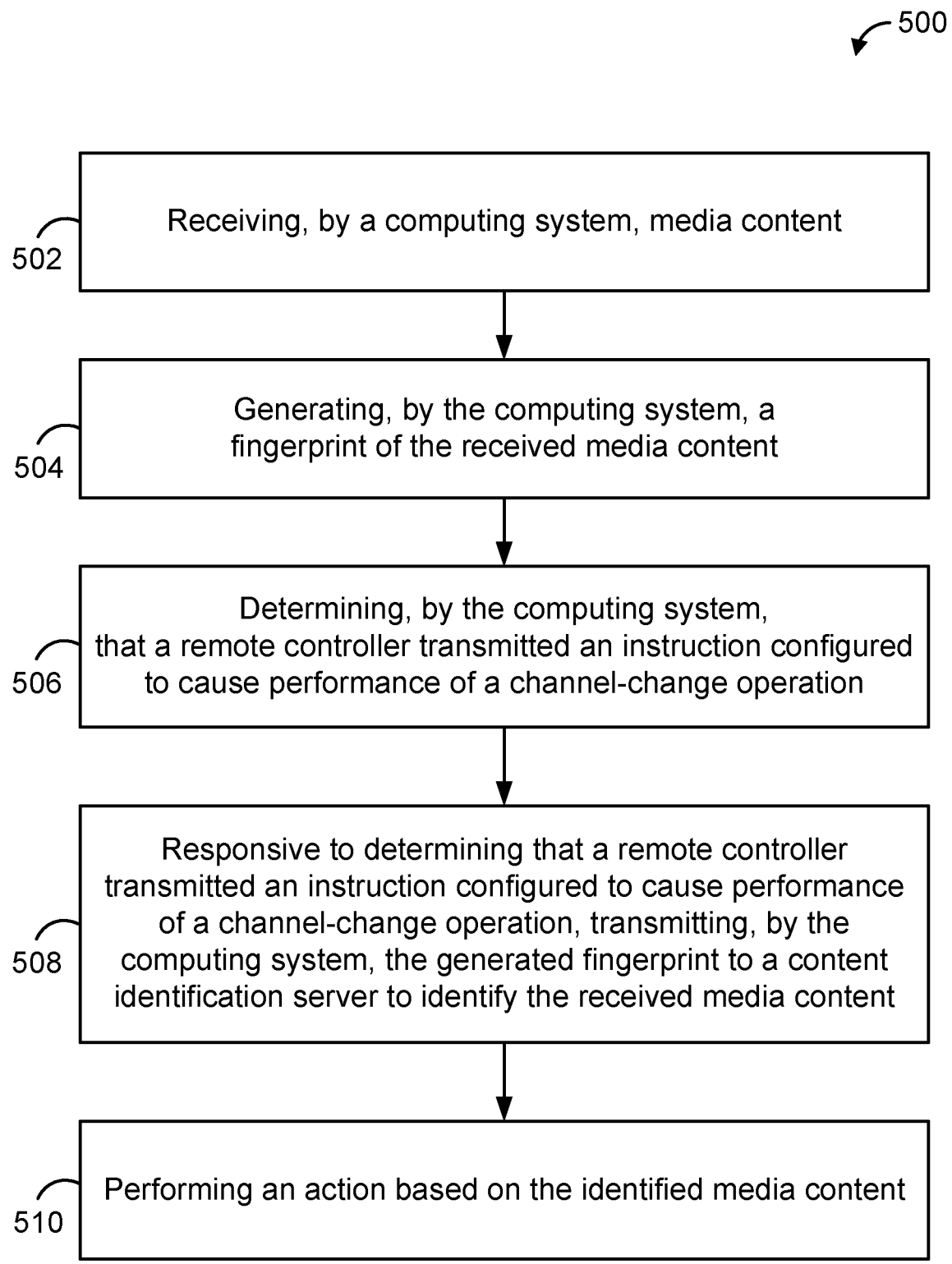
FIG. 5 is a flow chart of another example method.

FIG. 5 is a flow chart illustrating an example method 500. At block 502, the method 500 can include receiving, by a computing system, media content. At block 504, the method 500 can include generating, by the computing system, a fingerprint of the received media content. At block 506, the method 500 can include determining, by the computing system, that a remote controller transmitted an instruction configured to cause performance of a channel-change operation. At block 508, the method 500 can include responsive to determining that the remote controller transmitted the instruction configured to cause performance of a channel-change operation, transmitting, by the computing system, the generated fingerprint to a content identification server to identify the received media content. At block 510, the method 500 can include performing an action based on the identified media content.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more example of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method comprising:
    receiving, by a computing system, media content;
    generating, by the computing system, a fingerprint of received media content;
    determining, by the computing system, that a channel-change operation was performed via a classifier trained to determine that the channel-change operation was performed, wherein the classifier was trained with sample media content to detect an occurrence of the channel-change operation in the media content that is associated with a user changing a channel;
    responsive to determining that the channel-change operation was performed, transmitting, by the computing system, the fingerprint to a content identification server to identify the received media content;
    identifying supplemental content based on the fingerprint associated with the channel-change operation; and
    inserting the supplemental content into the received media content, wherein the supplemental content is provided for display in conjunction with the received media content.

2. The method of claim 1, wherein the computing system is a media presentation device, wherein the media presentation device is connected to a receiver, wherein receiving the media content comprises receiving the media content from the receiver, and wherein determining that the channel-change operation was performed comprises determining that the receiver performed the channel-change operation.

3. The method of claim 1, wherein the computing system is a media presentation device, wherein the media presentation device is connected to a receiver, wherein receiving the media content comprises receiving the media content from the receiver, and wherein determining that the channel-change operation was performed comprises determining that a synchronization handshake between the media presentation device and the receiver was lost.

4. The method of claim 1, wherein generating the fingerprint of the received media content occurs responsive to determining that the channel-change operation was performed.

5. The method of claim 1, wherein generating the fingerprint of the received media content and transmitting the generated fingerprint to the content identification server to identify the received media content both occur proximate a time of the determining that the channel-change operation was performed.

6. The method of claim 1, wherein the computing system is a media presentation device, wherein the method further comprises:
    presenting, by the media presentation device, via a user interface of the media presentation device, the received media content, and wherein taking action based on the identified media content comprises causing supplemental content to be presented in conjunction with the media content being presented by the media presentation device.

7. The method of claim 1, wherein taking action based on the identified media content comprises recording presentation of the identified media content for use in a channel ratings system.

8. The method of claim 1, wherein the media content is video content.

9. A non-transitory computer-readable medium having stored thereon program instructions that upon execution by a processor, cause performance of a set of operations comprising:
    receiving, by a computing system, media content;
    generating, by the computing system, a fingerprint of received media content; determining, by the computing system, that a channel-change operation was performed via a classifier trained to determine that the channel-change operation was performed, wherein the classifier was trained with sample media content to detect an occurrence of the channel-change operation in the media content that is associated with a user changing a channel;
    responsive to determining that the channel-change operation was performed, transmitting, by the computing system, the fingerprint to a content identification server to identify the received media content;
    identifying supplemental content based on the fingerprint associated with the channel-change operation; and
    inserting the supplemental content into the received media content, wherein the supplemental content is provided for display in conjunction with the received media content.

10. The non-transitory computer-readable medium of claim 9, wherein the computing system is a media presentation device, wherein the media presentation device is connected to a receiver, wherein receiving the media content comprises receiving the media content from the receiver, and wherein determining that the channel-change operation was performed comprises determining that the receiver performed the channel-change operation.

11. The non-transitory computer-readable medium of claim 9, wherein the computing system is a media presentation device, wherein the media presentation device is connected to a receiver, wherein receiving the media content comprises receiving the media content from the receiver, and wherein determining that the channel-change operation was performed comprises determining that a synchronization handshake between the media presentation device and the receiver was lost.

12. The non-transitory computer-readable medium of claim 9, wherein generating the fingerprint of the received media content occurs responsive to determining that the channel-change operation was performed.

13. The non-transitory computer-readable medium of claim 9, wherein generating the fingerprint of the received media content and transmitting the generated fingerprint to the content identification server to identify the received media content both occur proximate a time of the determining that the channel-change operation was performed.

14. The non-transitory computer-readable medium of claim 9, wherein the computing system is a media presentation device, wherein the set of operations further comprises:
presenting, by the media presentation device, via a user interface of the media presentation device, the received media content, and wherein taking action based on the identified media content comprises causing supplemental content to be presented in conjunction with the media content being presented by the media presentation device.

15. The non-transitory computer-readable medium of claim 9, wherein taking action based on the identified media content comprises recording presentation of the identified media content for use in a channel ratings system.

16. The non-transitory computer-readable medium of claim 9, wherein the media content is video content.

17. A computing system comprising:
a processor; and
a non-transitory computer-readable storage medium, having stored thereon program instructions that, upon execution by the processor, cause performance of a set of operations comprising:
receiving, by the computing system, media content;
generating, by the computing system, a fingerprint of received media content;
determining, by the computing system, that a channel-change operation was performed via a classifier trained to determine that the channel-change operation was performed, wherein the classifier was trained with sample media content to detect an occurrence of the channel-change operation in the media content that is associated with a user changing a channel;
responsive to determining that the channel-change operation was performed, transmitting, by the computing system, the fingerprint to a content identification server to identify the received media content;
identifying supplemental content based on the fingerprint associated with the channel-change operation; and
inserting the supplemental content into the received media content, wherein the supplemental content is provided for display in conjunction with the received media content.

18. The computing system of claim 17, wherein the computing system is a media presentation device, wherein the media presentation device is connected to a receiver, wherein receiving the media content comprises receiving the media content from the receiver, and wherein determining that the channel-change operation was performed comprises determining that the receiver performed the channel-change operation.

19. The computing system of claim 17, wherein the computing system is a media presentation device, wherein the media presentation device is connected to a receiver, wherein receiving the media content comprises receiving the media content from the receiver, and wherein determining that the channel-change operation was performed comprises determining that a synchronization handshake between the media presentation device and the receiver was lost.

20. The computing system of claim 17, wherein generating the fingerprint of the received media content occurs responsive to determining that the channel-change operation was performed.

* * * * *

UNITED STATES PATENT AND TRADEMARK OFFICE
CERTIFICATE OF CORRECTION

PATENT NO. : 11,778,285 B2  
APPLICATION NO. : 17/175788  
DATED : October 3, 2023  
INVENTOR(S) : Harron et al.

Page 1 of 1

It is certified that error appears in the above-identified patent and that said Letters Patent is hereby corrected as shown below:

In the Claims

In Column 14, Claim 9, Lines 26-33, delete "determining, by the computing system, that a channel-change operation was performed via a classifier trained to determine that the channel-change operation was performed, wherein the classifier was trained with sample media content to detect an occurrence of the channel-change operation in the media content that is associated with a user changing a channel;" and insert the same on Line 27, as a new point.

Signed and Sealed this  
Twenty-first Day of November, 2023

Katherine Kelly Vidal  
*Director of the United States Patent and Trademark Office*